United States Patent

[11] 3,542,004

| [72] | Inventor | George W. Cornelius,<br>279 W. 7th St.,<br>San Pedro, California |
|---|---|---|
| [21] | Appl. No. | 752,107 |
| [22] | Filed | Aug. 9, 1968 |
| [45] | Patented | Nov. 24, 1970 |

[54] RECYCLE APPARATUS
22 Claims, 15 Drawing Figs.

| [52] | U.S. Cl. | 123/119 |
|---|---|---|
| [51] | Int. Cl. | F02m 25/06 |
| [50] | Field of Search | 123/119A,D |

[56] References Cited
UNITED STATES PATENTS

| 2,700,967 | 2/1955 | Maker | 123/119 |
|---|---|---|---|
| 2,722,927 | 11/1955 | Cornelius | 123/119 |
| 3,204,621 | 9/1965 | Holiday | 123/119 |
| 3,457,906 | 7/1969 | Daigh | 123/119 |

*Primary Examiner*—Wendell E. Burns
*Attorney*—Fulwider, Patton, Rieber, Lee & Utech

ABSTRACT: A recycle apparatus including a conduit leading from the exhaust manifold to the intake manifold of an internal combustion engine and a recycle valve disposed therein. The recycle valve has a light-throttle position permitting a relatively small amount of exhaust gas to recycle from the exhaust manifold to the intake manifold and a heavy-throttle position wherein a relatively large amount of exhaust gas is permitted to recycle. A control means is coupled to the throttle controlling the recycle valve to bleed in only such relatively small amount of exhaust when the engine is idling to avoid rapid vacuum decrease in the intake manifold and consequent erratic operation on such valve.

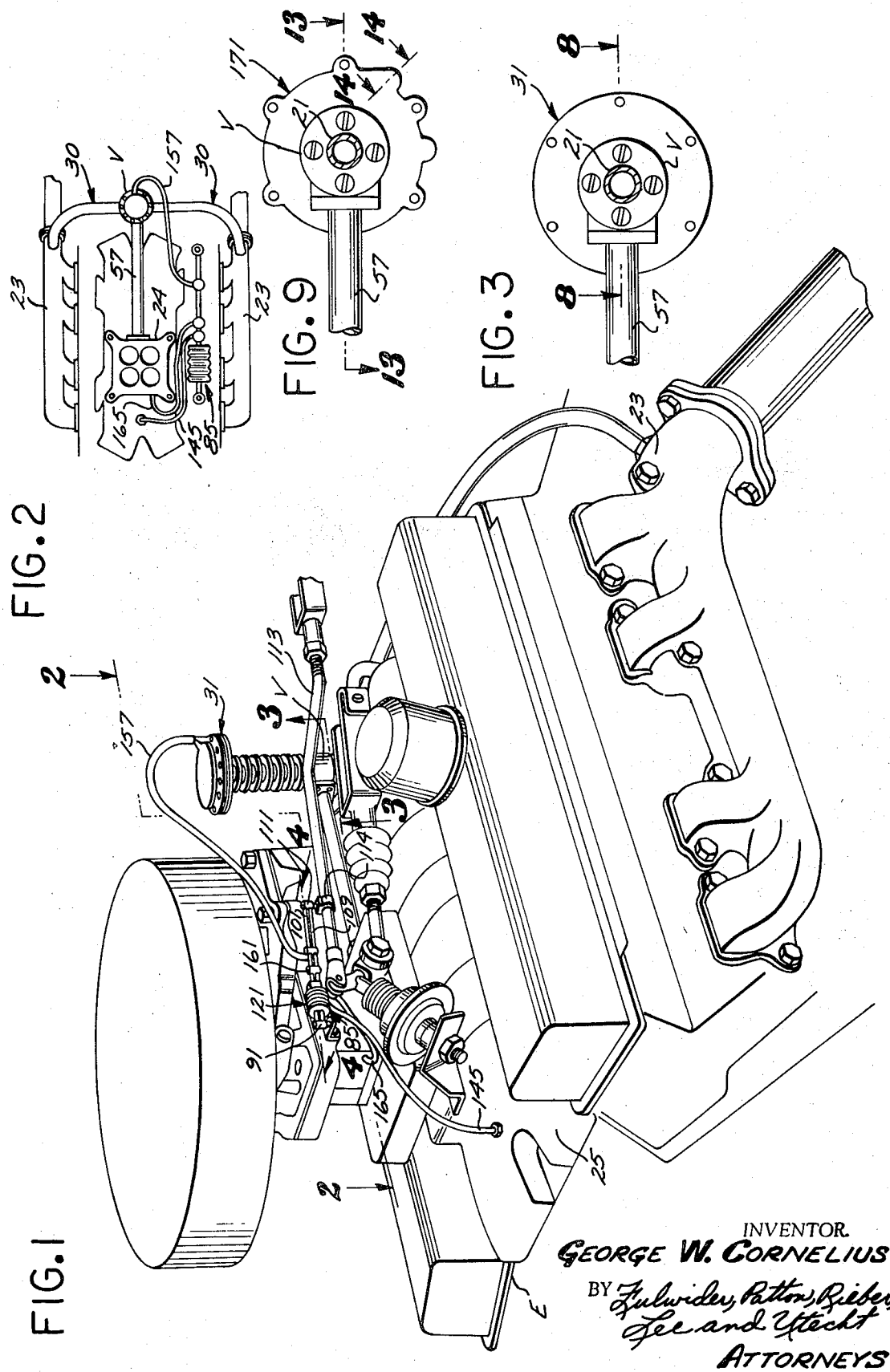

Patented Nov. 24, 1970
3,542,004
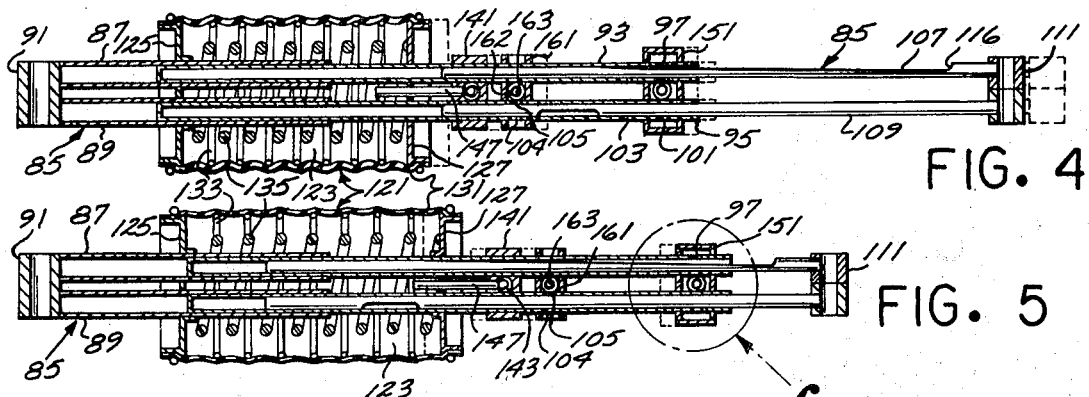
FIG. 4
FIG. 5
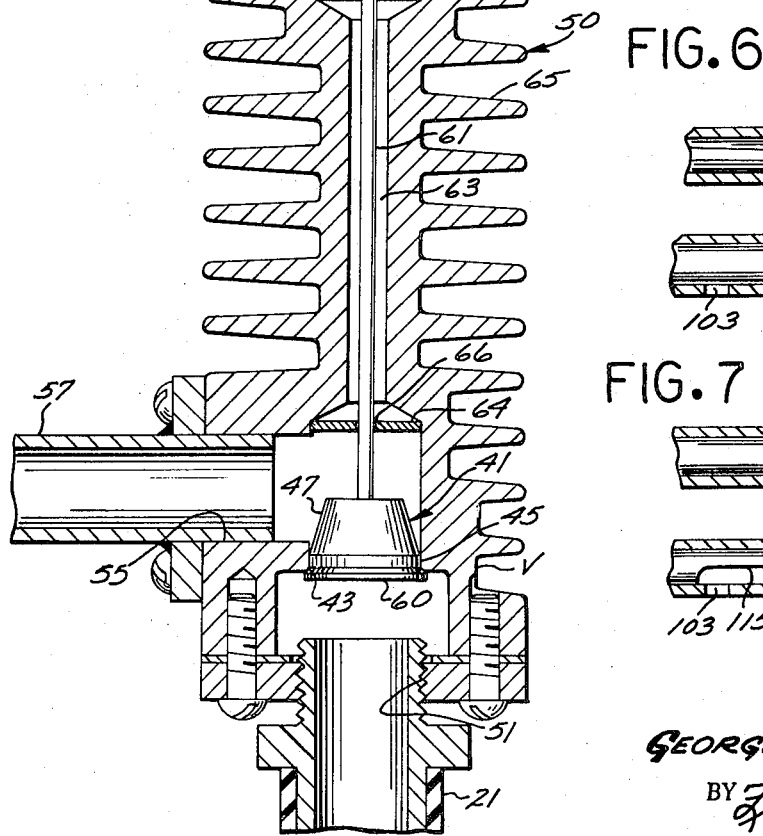
FIG. 8
FIG. 6
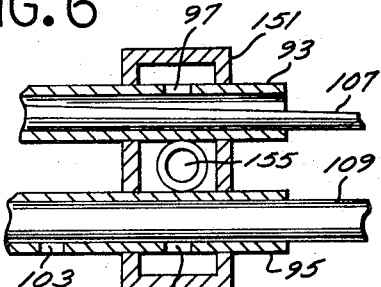
FIG. 7
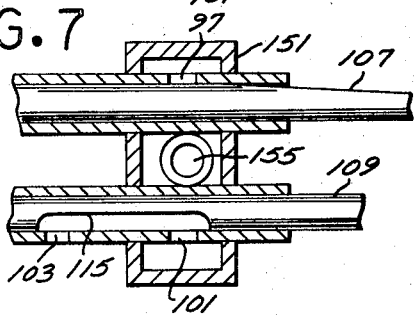
INVENTOR.
GEORGE W. CORNELIUS
BY Fulwider, Patton, Rieber, Lee and Utecht
ATTORNEYS

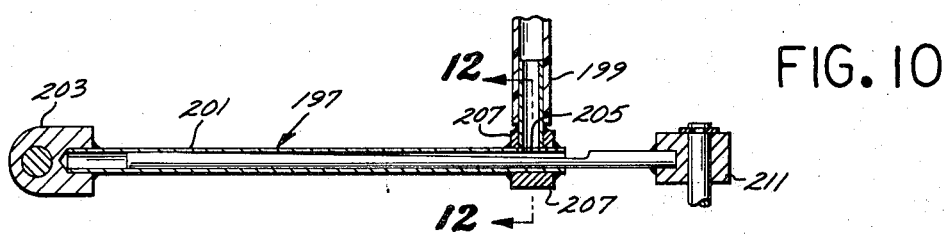
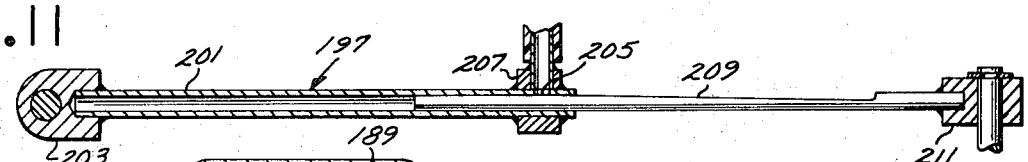
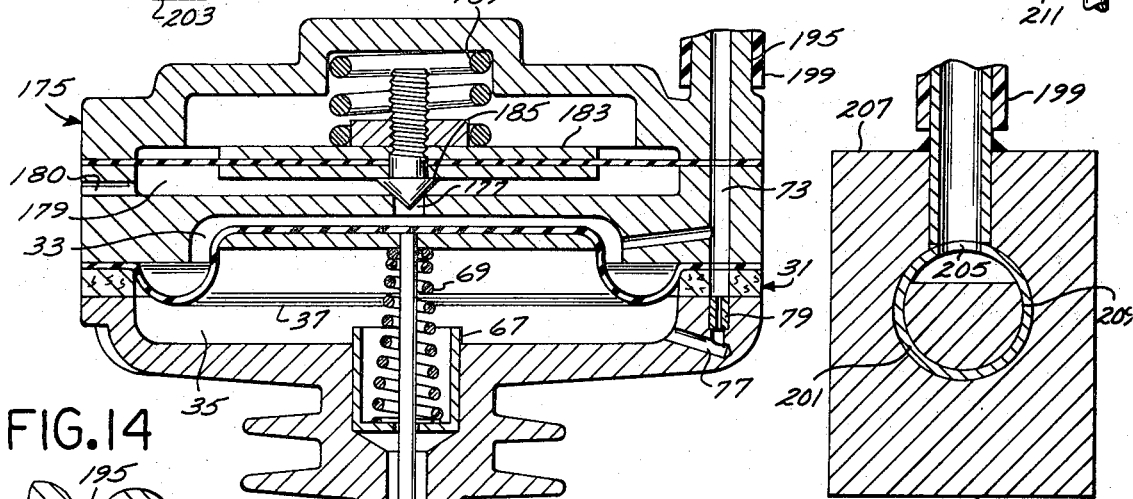
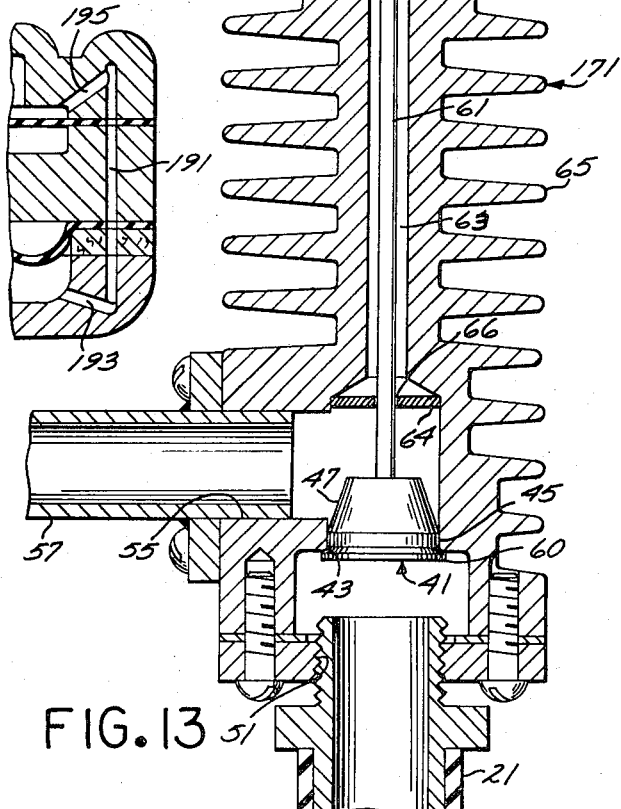
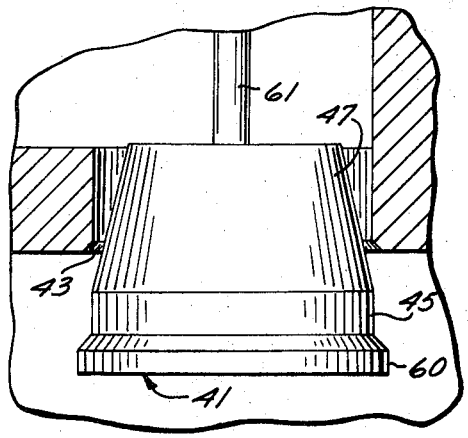

RECYCLE APPARATUS

BACKGROUND OF THE INVENTION

1. Field of the Invention

The present invention relates generally to the field of internal combustion engines and more particularly to an exhaust gas recycle apparatus.

2. Description of Prior Art

Apparatus have been proposed for controlling recycling of exhaust gases from the exhaust manifold to the intake manifold of an internal combustion engine in response to engine throttle settings. Apparatus of this type is shown in my U.S. Pat. No. 2,722,927 Under certain conditions apparatus of this type occasionally are subject to erratic recycle valve operation at light-throttle settings because the valve is controlled by a diaphragm exposed on one side to the intake manifold vacuum, and when the valve is initially cracked at light-throttle settings the exhaust fed back to the intake manifold quickly raises the pressure therein, thus lowering the vacuum on such one side of the diaphragm and causing the valve to close prematurely.

SUMMARY OF THE INVENTION

The recycle apparatus of present invention is characterized by a two-position valve for controlling the rate of recycling of exhaust gases from the exhaust manifold to the intake manifold of an internal combustion engine. The valve is controlled by a control means formed with an air chamber and a vacuum chamber, such chambers being separated by a pressure-responsive member and a bleed passage communicating between such chambers. The vacuum chamber is in communication with the intake manifold and a throttle actuated device controls flow of air to the air chamber in response to throttle settings to thereby cause the valve to be opened to its light-throttle position at low throttle settings and to thereafter be opened to its heavy-throttle position at heavier throttle settings.

The recycle apparatus of the present invention may include adjustment means for increasing the rate of airflow to the air chamber in response to increases in engine speed and consequent vacuum buildup in the intake manifold at selected throttle settings to thereby adjust the recycle valve toward its closed position to maintain the same rate of recycle irrespective of the vacuum buildup.

An object of the present invention is to provide a recycle apparatus which will recycle exhaust gases from the exhaust manifold of an internal combustion engine through the intake manifold thereof in accordance with various engine conditions.

It is also an object of present invention to provide a recycle apparatus of the type described in which the recycle valve does not surge or flutter at low engine speeds when relatively small amounts of exhaust gases are recycled.

A further object of the present invention is to provide a recycle apparatus of the type described which will recycle a relatively high percentage of the exhaust gases during deceleration of the engine to introduce additional gases to the intake manifold and raise the compression in the cylinders.

A still further object of the present invention is to provide a recycle apparatus of the type described which will introduce additional air to the cylinders during deceleration of the engine to enhance combustion.

An additional object of the present invention is to provide for sufficient recycling and introduction of additional air to the intake manifold during deceleration of the engine to induce sufficiently complete combustion to avoid introduction of rich exhaust gases to an afterburner installed in the exhaust system thereby preventing overheating of such afterburner.

Other objects and features of the invention will become apparent from consideration of the following description taken in connection with the accompanying drawings.

DESCRIPTION OF THE DRAWINGS

FIG. 1 is a perspective view, partially broken away, of an internal combustion engine which incorporates a recycle apparatus embodying the present invention;

FIG. 2 is a horizontal sectional view, in reduced scale, taken along line 2-2 of FIG. 1 showing the top of the intake manifold of the engine shown in FIG. 1;

FIG. 3 is a horizontal sectional view, in enlarged scale, taken along the line 3-3 of FIG. 1;

FIGS. 4 and 5 are vertical sectional views, in enlarged scale, taken along the line 4-4 of FIG. 1 and showing the recycle apparatus at two different settings;

FIGS. 6 and 7 are partial vertical sectional views, in enlarged scale, taken from the circle designated 6 in FIG. 5 and showing the recycle apparatus in two different settings;

FIG. 8 is a vertical sectional view, in enlarged scale, taken along the lines 8-8 of FIG. 3;

FIG. 9 is a horizontal sectional view, in enlarged scale, similar to FIG. 3 of a second embodiment of the recycle apparatus of present invention;

FIGS. 10 and 11 are vertical sectional views similar to FIG. 4 of a throttle responsive device included in the embodiment of the invention shown in FIG. 9 and showing the device in two different settings;

FIG. 12 is a vertical sectional view, in enlarged scale, taken along the line 12-12 of FIG. 10;

FIG. 13 is a vertical sectional view, in enlarged scale, taken along the line 13-13 of FIG. 9;

FIG. 14 is a vertical sectional view, in enlarged scale, taken along the line 14-14 of FIG. 9; and FIG. 15 is a vertical sectional view, in enlarged scale, of the poppet included in the recycle valve shown in FIG. 13.

DESCRIPTION OF THE PREFERRED EMBODIMENT

The recycle apparatus shown in FIGS. 1 through 8 includes a return, or feedback, conduit means 30 leading from the exhaust manifolds 23 to an adapter pad 24 disposed on the intake manifold 25 and having a recycle valve V therein. Referring to FIG. 8, the valve V includes a control, generally designated 31, formed with an air chamber 33 and a vacuum chamber 35, such chambers being separated by a pressure responsive diaphragm 37 which controls positioning of a poppet, generally designated 41, relative to its seat 43. The poppet 41 is formed with a cylindrical section 45 and tapers upwardly and inwardly therefrom to form a frustoconical section 47, the cylindrical section 45 fitting the seat 43 relatively close whereby on initial opening of the valve V exhaust gases will be introduced into the intake manifold at a relatively slow rate to provide the desired amount of recycle without undue rapid decrease of the intake manifold vacuum resulting in reduced vacuum in the vacuum chamber 35 to cause the diaphragm 37 to prematurely close the valve V causing the valve to surge open and closed.

Still referring to FIG. 8, the control and valve V are included in a single housing, generally designated 50, formed on its bottom end with a valve inlet 51 to which the exhaust return conduit 21 is connected and an outlet 55 to which a tube 57 is connected, such tube leading to the intake manifold 25.

The poppet 41 has its frustoconical section 47 angled to provide the desired increase in recycle valve opening for the particular engine E and includes a lower flange 60 which rests on the seat 43 when the valve V is closed. The poppet 41 is carried on the bottom end of a reciprocating rod 61 which projects upwardly through a bore 63 formed in the neck of the housing 50, such neck being formed with a plurality of vertically spaced peripheral vanes 65 for rapid heat dissipation. The lower end of the rod 61 is maintained centrally aligned by a disk 64 having a central bore 66 which closely fits such rod to restrict communication of intake manifold vacuum surges to the chamber 35. The walls of the bore 66 also scrape the reciprocating rod 61 to prevent formation of carbon deposits thereon. The upper portion of the bore 63 is enlarged and receives a spring retainer 67 which receives a compression spring 69 for biasing the center of the diaphragm 37 upwardly. The retainer 67 projects upwardly into the vacuum chamber 35 a short distance to limit downward movement of the diaphragm 37 to prevent its convolution from blocking communication of gases to the intake manifold tube 57. A V-notch 70 is included in the upper edge of the retainer 67 to insure communication to the bore 63.

The housing of the control 31 includes an upwardly projecting nipple 71 formed with a central bore 73 which is in communication with the air chamber 33 by means of a passage 75 and is in communication with the vacuum chamber 35 by means of a passage 77, a flow restricting orifice 79 being interposed between the passage 73 and vacuum chamber passage 77. A conduit 81 connects with the nipple 71 and leads to a throttle responsive device, generally designated 85 (FIG. 1) for controlling admission of air to the air chamber 33.

Referring to FIGS. 4 and 5, the throttle responsive device 85 includes a pair of open ended female tubes 87 and 89 carried on one end from a fitting 91 mounted from the block of the engine E. A male metering tube and auxiliary tube 93 and 95, respectively, are telescoped into the open end of the female tubes 87 and 89, the metering tube 93 being formed with a control outlet 97 in its wall and the auxiliary tube 95 including inlet and outlet override bores 101 and 103, respectively, spaced along its wall. The male auxiliary tube 95 also includes opposed air feed inlet and outlet bores 104 and 105 in its wall. A tapered metering rod 107 telescopes into the open end male tube 93 and an auxiliary rod 109 telescopes into the tube 95, the free ends of such rods being carried on a fitting 111 connected to the linkage 113 of the conventional foot throttle of the engine E by a clasp 114. The metering pin 107 is flat on its top side and tapers downwardly to a point 116 where it assumes its full diameter.

Referring to FIG. 7, the auxiliary rod 109 includes an elongated notch 115 in its lower side for selectively registering with the override bores 101 and 103 to admit air to the air chamber 33 of the recycle valve control during deceleration.

Pressure responsive adjustment bellows, generally designated 121, surround the telescoped ends of the male and female rods 87, 93, 89 and 95, and define a pressure chamber 123. The adjustment bellows 121 include spaced apart end flanges 125 and 127, the flange 125 being mounted on the female tubes 87 and 89 and the flange 127 being mounted on the male tubes 93 and 95. The wall of the bellows 121 is formed by a cylindrical flexible cover 131 extended between the flanges 125, 127 and affixed to the peripheries thereof, such cover 131 being supported by spaced stiffening loops 133. The flanges 125 and 127 are biased apart by a coil spring 135 to maintain the male and female tubes telescoped to their extended positions. Still referring to FIGS. 4 and 5, a fitting 141 is carried medially on the male tubes 93 and 95 and includes a transverse bore 143 which has its exterior end connected with the intake manifold 25 by means of a conduit 145 (FIG. 1). The interior end of the bore 143 is connected with the interior of the bellows 121 by an axial tube 147 projecting through the end flange 127.

Referring to FIGS. 1, 4 and 7, a closed ended transverse tube 151 is mounted on the right-hand end of the male tubes 93 and 95 with the outlet bores 97 and 101 opening into the interior thereof. The tube 151 includes a bore 155 in its wall, such bore being in communication with the air chamber 33 of the control 31 by means of a control conduit 81 (FIG. 1). Still referring to FIGS. 1 and 4, an open ended cross tube 161 is mounted on the male tubes 93 and 95 and encompasses the inlet 105 forming a chamber 162 having an outlet 163 which is connected with the intake manifold 25 by means of an air feed conduit 165.

The valve portion of the recycle apparatus, generally designated 171, shown in FIGS. 10 through 15, is generally similar to the above described apparatus except that there is no provision for maintaining constant recycle irrespective of engine speed increase at particular throttle settings and opening of the valve V during deceleration is accomplished by an override assembly, generally designated 175, and mounted on the control 31. The upper wall of the air chamber 33 includes a port 177 which leads to an atmosphere chamber 179 in communication with the atmosphere by a bore 180 and separated from a vacuum chamber 181 by means of a pressure responsive diaphragm 183. The diaphragm 183 carries a poppet 185 which confronts the port 177 and is biased downwardly thereagainst by a compression spring 189. Referring to FIG. 14, the vacuum chamber 35 of control 31 is in communication with the vacuum chamber 181 by means of a vertical passage 191 and a pair of angled transverse passages 193 and 195.

The air passage 73 from the control 31 extends upwardly into a nipple 195 formed in the override means 175, such nipple being connected with a throttle responsive device, generally designated 197, by means of a tube 199. The device 197 includes a tube 201 carried on one end by a fitting 203 pivotally fixed to the block of the engine E. An air outlet 205 is formed in the wall of the tube 201 near its right-hand end and is in communication with the tube 199 by means of a connecting fitting 207. Flow of air into the right-hand end of the tube 201 and out the outlet 205 is controlled by a tapered metering pin 209 carried on its right-hand end from a fitting 211 supported from the linkage of the engine throttle (not shown).

In operation the recycle apparatus shown in FIGS. 1 through 8 is mounted on the engine E as shown in FIG. 1 and when the engine is turned over by the starter a small vacuum will build up in the intake manifold 25 and consequently in the vacuum chamber 35 of the control 31. However, the compression spring 69 will maintain the diaphragm 37 biased in its upper position maintaining the poppet 41 in its closed position shown in FIG. 8. While the throttle is in its idling position, the metering rod 107 will be in its extended position relative to the metering tube 93, as shown in broken lines in FIG. 4, to block airflow out the control outlet 97 and the auxiliary rod 109 will be positioned to maintain the notch 115 out of registration with the override passages 103 and 101 in the auxiliary tube 95 to thereby prevent any air passage to the air chamber 33. consequently during idle the valve V will remain closed and there will be no recycling of exhaust gases.

When the throttle is opened slightly to operate the engine at what might be termed a light cruise, the metering rod 107 will be telescoped into the metering tube 93 to the position shown in solid lines in FIG. 4 thereby admitting a predetermined amount of airflow out the control passage 97 and to the air chamber 33 of the control 31 to create sufficient pressure differential across the diaphragm 37 to open the poppet 41 and maintain the cylindrical section 45 in registration of the seat 43, thus only cracking the valve V. It is of particular importance that the valve is initially only cracked thereby admitting exhaust gases at a relatively slow rate to the intake manifold 25 and avoiding any sudden surges which would be immediately sensed in the vacuum chamber 35 to lower the vacuum and close the valve V prematurely, causing it to surge open and closed.

Depressing the throttle further to a heavy cruise position causes the metering rod 107 to be telescoped into the tube 93 to the position shown in FIG. 5 thereby increasing the airflow rate into the open end of such tube and out the control outlet 97 to the air chamber 33 to thereby open the valve V further and register the frustoconical section 47 of the poppet 41 with the seat 43 to cause gradual increase in the cross-sectional flow area defined between such poppet and the seat 43. The angle of the frustoconical section 47 will vary with engine size to provide the desired amount of exhaust recycle at particular heavy cruise throttle settings. Since the intake manifold vacuum is less at heavier throttle settings the bellows 121 are slightly relaxed over their position during light cruise as shown in FIG. 4. If the throttle is held such light cruise position for a period of time the engine speed will increase thereby increasing the vacuum in the intake manifold 25 and consequently in the bellows 121. Such increase in the vacuum in the bellows 121 will cause it to partially collapse to the position shown in broken lines in FIG. 5 thereby retracting the male tube 93 on the metering rod 107 to decrease the airflow out the outlet 97 to the air chamber 33. Such decrease in airflow to the air chamber 33 will enable the bleed orifice 79 to accommodate a larger portion of the air introduced to the passage 73, thus reducing the differential across the diaphragm 37 to permit the compression spring 69 to push the diaphragm 37 upwardly and move the poppet 41 toward its closed position thereby forming a greater restriction to exhaust flow from the exhaust manifold 23 to the intake manifold 25. Consequently, rather than permitting the increased vacuum in the intake manifold 25 to correspondingly increase the exhaust recycle, the bellows 121 affect automatic adjustment to move the valve V toward its closed position to maintain a constant exhaust recycle irrespective of the intake manifold vacuum increase.

At wide open throttle, the vacuum in the vacuum chamber 35 will be essentially zero, or atmospheric, enabling the compression spring 69 to maintain the diaphragm 37 in its uppermost position, thus closing the valve V and preventing any recycle.

At wide open throttle the metering rod 107 will be moved to its left-most position and the vacuum in the bellows 101 will be relatively low to enable such bellows to expand and register the full diameter 116 with the end of the metering tube 93 to block flow to the air chamber 33. The pressure on opposite sides of the diaphragm 37 will thus become equalized closing the valve V and discontinuing recycle.

During deceleration, as when an automobile is coasting downhill, combustion is relatively incomplete and mixtures containing relatively high concentrations of fuel are introduced to the exhaust manifold. During such deceleration the throttle will maintain the auxiliary rod 109 in the position shown in FIG. 4 and the vacuum in the intake manifold 25 will be relatively high, as for instance, 22 inches of water, thus compressing the bellows 121 to register the notch 115 in the auxiliary rod 109 with the override passages 103 and 101, as shown in FIG. 7, to admit air to the air chamber 33, at a high rate of flow and fully open the recycle valve V. Likewise, the left-hand end of the auxiliary rod 109 (FIGS. 4 and 5) is pulled to the right beyond the aligned air feed inlet and outlet passages 104 and 105 in the tube 95, thus admitting air through the air feed conduit 165 to the intake manifold 25. Thus, the valve V will be fully open and the vacuum in the intake manifold 25 very high thereby providing for recycling of a large percentage of the exhaust gases to increase the pressure in the cylinders and enhance combustion. Also, the tube 165 will introduce air into the intake manifold 25 thereby providing sufficient air to induce more complete combustion of the relatively rich exhaust gases. It is noted that the metering rod 107 and auxiliary rod 109 could be replaced by one rod but such an arrangement has proven to provide flow interference between the various functions carried out. Also, it has been found preferable to maintain the manifold sense conduit 145 separate from the air feed conduit 165 to avoid sensing pressure drops caused by the airflow air feed conduit.

The general operation of the recycle apparatus 171 in response to various throttle settings is substantially the same as that described above except that during deceleration, when the intake manifold vacuum is relatively high, such vacuum is communicated from the control 31 through passages 193, 191 and 195 (FIG. 14) to the vacuum chamber 181 to cause the diaphragm 183 to lift a poppet 185 clear of the port 177. Such opening of the port 177 spills air from the atmosphere chamber 179 into the air chamber 33 to force the control diaphragm 37 downwardly to move the valve V to its full open position and effect recycle of substantially all the exhaust gases.

From the foregoing, it will be apparent that the recycle system of present invention is straightforward in design and economical to manufacture. It provides for control of exhaust feedback in accordance with throttle settings and overcomes previous problems with regard to recycle valve surging and fluttering in light cruise situations. Further, the recycle apparatus provides a choice of permitting or preventing recycling while the engine is idling and provides for high percentages of recycle during deceleration, along with the introduction of additional air to the cylinders.

Various modifications and changes may be made in regard to the foregoing detailed discussion without departing from the spirit of the invention or the scope of the following claims;

I claim:

1. Recycle apparatus for use with an internal combustion engine, said apparatus comprising:

a recycle conduit connecting the exhaust manifold of said engine with the intake manifold thereof;

a valve in said conduit for controlling flow of exhaust therethrough;

control means for controlling said valve and including an air chamber and a vacuum chamber, a pressure responsive member being interposed between said chambers and connected with said valve, a bleed passage for communicating said air chamber with said vacuum chamber;

a throttle responsive device for progressively increasing the airflow rate to said air chamber as said throttle is opened; and adjustment means responsive to increases in engine speed at various throttle settings for reducing said airflow rate to said air chamber whereby when said throttle is opened to a selected setting said throttle responsive device will provide a selected rate of airflow to said air chamber to open said valve sufficiently to provide a predetermined rate of exhaust recycle and when the engine speed increases for said selected throttle setting causing the intake manifold vacuum to increase, said adjustment means will reduce the rate of airflow below said selected rate to adjust said valve toward its position i to maintain said predetermined rate of exhaust recycle.

2. Recycle apparatus as set forth in claim 1 that includes override means responsive to deceleration of said engine fore communicating a relatively high rate of airflow to said air chamber to open said valve and provide for a high rate of exhaust recycle.

3. Recycle apparatus as set forth in claim 1 that includes air feed means responsive to deceleration of said engine to introduce air to such intake manifold to enhance combustion in the engine cylinders.

4. Recycle apparatus as set forth in claim 1 wherein:

said throttle responsive means includes female tube means mounted from said engine and open on one end, male tube means having one end telescopically received in said female tube means, open on its end opposite its one end, and formed with a control outlet in its wall, said device further including means mounted from the engine throttle linkage for being projected gradually into the open end of said male tube means as said throttle is opened, said rod means being shaped to cooperate with said male tube means to progressively increase the airflow rate in said open end of said male tube means and out said control outlet as said throttle is opened, a control conduit connecting said outlet with said air chamber;

and said adjustment means includes pressure responsive means extending over the telescoped ends of said tube means and connected on its opposite ends to said respective tube means; a sense conduit connecting said pressure responsive means with said intake manifold whereby when said throttle is opened to said selected setting said rod will be telescoped in one direction into said male tube means to provide said selected airflow rate to open said valve and cause said predetermined rate of exhaust recycle and when the engine speed increases for said throttle setting, the corresponding increased vacuum in said intake manifold will be communicated to and cause said pressure responsive means to contract accordingly and telescope said male tube means in the direction opposite said one direction on said rod means to decrease the flow rate of air delivered to said air chamber thereby adjusting said valve toward its closed position to maintain said predetermined rate of exhaust recycle.

5. A recycle control apparatus as set forth in claim 4 wherein
said male tube means includes an override outlet, an override conduit connecting said override outlet with said air chamber, said rod means includes a notch for registration with said override outlet to communicate air thereto, and said bellows are sufficiently flexible to enable the intake manifold vacuum during deceleration of said engine to effect sufficient collapsing thereof to register said notch with said override outlet to provide a relatively high rate of airflow to said air chamber whereby said valve will be opened to recycle a relatively high percentage of said exhaust.

6. Recycle apparatus as set forth in claim 4 wherein
said male tube means includes an air feed outlet normally closed by said rod means, an air feed conduit connecting said second outlet with said intake manifold, and said pressure responsive means sufficiently flexible to be contracted by the intake manifold vacuum during deceleration of said engine to move said rod means clear of said air feed outlet whereby air will be introduced to said intake manifold.

7. Recycle apparatus as set forth in claim 4 wherein
said female tube means includes first and second female tubes, said male tube means includes first and second male tubes telescopically received in said first and second female tubes, respectively, said first male tube being formed with said control outlet and said second male tube being formed with said override outlet, and said rod means includes a metering rod telescoped in said first male tube and an auxiliary rod formed with said notch and telescoped in said second male tube.

8. Recycle apparatus as set forth in claim 5 wherein:
said second male tube means includes an air feed outlet normally closed by said rod means; and
an air feed conduit connecting said air feed outlet with said intake manifold, and said pressure responsive means are sufficiently flexible to be contracted by the intake manifold vacuum during deceleration of said engine to move said rod means clear of said air feed outlet whereby air will be introduced to said intake manifold.

9. Recycle apparatus for use with an internal combustion engine, said apparatus comprising:
a recycle conduit connecting the exhaust manifold of said engine with the intake manifold thereof;
a valve in said conduit means for controlling flow of exhaust therethrough;
a throttle responsive device for progressively opening said valve as the engine throttle is opened; and
adjustment means responsive to increases in engine speed at various throttle settings for adjusting said throttle responsive device whereby when said throttle is opened to a selected setting said throttle responsive device will open said valve sufficiently to provide a predetermined rate of exhaust recycle and when the engine speed increases for said selected throttle a setting causing the intake manifold vacuum to increase, said adjustment means will adjust said valve toward its closed position to maintain said predetermined rate of exhaust recycle irrespective of said manifold vacuum increase.

10. Recycle apparatus as set forth in claim 9 wherein
said adjustment means is responsive to idling of said engine to close said valve.

11. Recycle apparatus as set forth in claim 9 wherein
said adjustment means is responsive to wide open throttle to close said valve thereby preventing recycle and dilution of the engine air-fuel mixture.

12. Recycle apparatus as set forth in claim 9 wherein
said adjustment means is responsive to cranking of said engine to close said valve.

13. Recycle apparatus for use with an internal combustion engine, said apparatus comprising:

a recycle conduit connecting the exhaust manifold of said engine with the intake manifold thereof;
engine sensing means for sensing the exhaust volume from said engine and responsive to a predetermined range of light-throttle settings to produce a first signal and to heavy-throttle settings to produce a second signal;
a recycle valve in said conduit and having a relatively light-throttle setting forming a relatively small flow area and a relatively heavy-throttle setting forming a relatively large flow area; and
control means connected with said sensing means and said valve and responsive to said first signal to maintain said valve at said light-throttle setting throughout said predetermined range of light-throttle settings and responsive to said second signal to open said valve to said heavy-throttle setting whereby said valve is maintained in said relatively light-throttle setting throughout said light-throttle range.

14. Recycle apparatus as set forth in claim 13 wherein
said valve includes a housing defining a with a port and a poppet shiftable axially therein and formed with a a predetermined cross section portion for registering in said port when said valve is in said light-throttle position to cooperate therewith in defining said relatively small flow area for passage of said relatively small amount of exhaust and a reduced in cross section portion for registering with said port when said valve is in said heavy-throttle position to cooperate therewith to define said relatively large flow area for admitting said relatively large amount of exhaust.

15. Recycle apparatus as set forth in claim 14 wherein
said predetermined cross section portion extends axially for a selected length and said poppet is arranged to be shifted axially in said port by said control means to maintain said predetermined cross section portion registered with said port throughout a selected range of light-throttle settings of said engine.

16. Recycle apparatus as set forth in claim 13 wherein
said control means includes an air chamber having an inlet, a vacuum chamber, a pressure responsive member interposed between said chambers and coupled with said valve, and a passage between said chambers to bleed air from said air chamber to said vacuum chamber, a control conduit connecting said vacuum chamber with said intake manifold, an air conduit connecting said inlet to said air chamber, and a throttle responsive device for controlling the rate of airflow through said air conduit, said device being coupled with the throttle of said engine and being responsive to positioning of said throttle in a light-throttle position to admit airflow to said air chamber at a rate which will produce sufficient pressure in said air chamber to cooperate with the vacuum in said vacuum chamber to create a sufficient pressure differential across said pressure responsive member to open said recycle valve to said light-throttle position, said device being responsive to positioning of said throttle in a heavy-throttle position to admit sufficient air to said air chamber to produce sufficient pressure therein to cooperate with the vacuum in said vacuum chamber to effect a sufficient pressure differential across said diaphragm to open said recycle valve to said heavy-throttle position to admit said relatively large amount of recycle exhaust.

17. Recycle apparatus as set forth in claim 16 wherein:
said engine is of the type that includes a pressure source which is responsive to variations in engine speed at selected throttle settings to develop different pressures in proportion thereto;
said throttle responsive device includes female tube means mounted from said engine and open on one end, male tube means having one end telescopically received in said female tube means, open on its end opposite its one end, and fore formed with an air outlet in its wall, said device further including a rod means mounted from the engine throttle linkage for being projected gradually into the open end of said male tube means as said throttle is opened, said rod means being shaped to cooperate with said male tube means to progressively increase the rate of air flow out of said outlet as said throttle is opened, a control conduit connecting said outlet with said air chamber, pressure responsive means extending over the telescoped ends of said tube means and connected on its opposite ends to said respective tube means, and a sense conduit connecting said pressure responsive means with said pressure source whereby when said throttle is opened to a selected setting said rod will be telescoped in one direction into said male tube means to provide a selected air flow rate to said air chamber to open said valve and cause a predetermined amount of exhaust to be recycled and when the engine speed changes for said throttle settings, the corresponding change in engine speed will cause the pressure source to change and cause said pressure responsive means to contract accordingly and telescope said male tube means in the direction opposite said one direction on said rod means to decrease the flow rate of air delivered to said air chamber thereby adjusting said valve toward its closed position to maintain said predetermined amount of exhaust recycle.

18. Recycle apparatus as set forth in claim 15 wherein:
said port is formed on one end with a valve seat and said poppet is formed with an enlarged flange disposed adjacent said constant cross section portion for seating on said seat; and
said control means is responsive to substantially wide open throttle to seat said flange on said seat to discontinue recycle of said exhaust.

19. Recycle apparatus as set forth in claim 13 wherein: said reduced-in-cross section portion is tapered and said poppet is arranged for axial projection in said port to progressively increase the effective flow area between said poppet and said port as the engine speed is increased; and
said control means progressively extends said poppet axially through said port as the engine throttle is opened throughout a selected range to increase the effective exhaust flow area through said valve.

20. Recycle apparatus for use with an internal combustion engine, said apparatus comprising:
a recycle conduit connecting the exhaust manifold of said engine with the intake manifold thereof;
a valve in said conduit for controlling flow of exhaust therethrough;
control means for controlling said valve and including an air chamber and a vacuum chamber, a pressure responsive member being interposed between said chambers and connected with said valve, and a bleed passage for communicating air from said air chamber to said vacuum chamber;
a throttle responsive device for progressively increasing the flow of air to said air chamber as said throttle is opened;
a variable pressure source responsive to idling of said engine to produce a predetermined pressure; and
override means including a housing mounted on said control means and formed with first and second chambers separated by a pressure responsive element, a passage communicating said first chamber with said pressure source, a second passage communicating said second chamber with the atmosphere and a port connecting said air and second chambers, a valve poppet carried by said pressure responsive element for closing said port and bias means urging said poppet into its closed position whereby when said engine is decelerated the pressure in said first chamber will be raised to a predetermined pressure to raise said poppet and admit air through said port to said air chamber to open said valve and provide for relatively high recycle of exhaust gases.

21. Recycle apparatus as set forth in claim 13 wherein said control means includes a restriction for limiting communication of said manifold vacuum to said vacuum chamber to dampen surges caused by erratic engine fluctuations.

22. Recycle apparatus as set forth in claim 13 wherein said control means includes female tube means mounted from said engine and open on one end, male tube means having one end telescopically received in said female tube means, open on its end opposite its one end, and formed with an air outlet in its wall, said device further including a rod means mounted from the engine throttle linkage for being projected gradually into the open end of said male tube means as said throttle is opened, said rod means being shaped to cooperate with said male tube means to progressively increase the rate of airflow out said outlet as said throttle is opened, a control conduit connecting said outlet with said air chamber, pressure responsive means extending over the telescoped ends of said tube means and connected on its opposite ends to a said respective tube means, and a sense conduit connecting said pressure responsive means with said intake manifold whereby when said throttle is opened to a selected setting said rod will be telescoped in one direction into said male tube means to provide a selected airflow rate to said air chamber to open said valve and cause a predetermined amount of exhaust to be recycled and when the engine speed increases for said throttle setting, the corresponding increased vacuum in said intake manifold will be communicated to and cause said pressure responsive means to contract accordingly and telescope said male tube means in the direction opposite said one direction on said rod means to decrease the flow rate of air delivered to said air chamber thereby adjusting said valve toward its closed position to maintain said predetermined amount of exhaust recycle.